US009366588B2

(12) United States Patent
Lee

(10) Patent No.: US 9,366,588 B2
(45) Date of Patent: Jun. 14, 2016

(54) DEVICES, SYSTEMS AND METHODS TO DETERMINE AREA SENSOR

(71) Applicant: LifeScan, Inc., Milpitas, CA (US)

(72) Inventor: Curtis Lee, Philadelphia, PA (US)

(73) Assignee: LifeScan, Inc., Milpitas, CA (US)

( * ) Notice: Subject to any disclaimer, the term of this patent is extended or adjusted under 35 U.S.C. 154(b) by 184 days.

(21) Appl. No.: 14/108,062

(22) Filed: Dec. 16, 2013

(65) Prior Publication Data

US 2015/0168205 A1    Jun. 18, 2015

(51) Int. Cl.
| | |
|---|---|
| *G01G 19/52* | (2006.01) |
| *G01G 21/28* | (2006.01) |
| *G01G 19/414* | (2006.01) |
| *G01G 23/00* | (2006.01) |
| *H04M 1/21* | (2006.01) |
| *H04M 1/02* | (2006.01) |
| *H04M 99/00* | (2006.01) |
| *G01L 1/26* | (2006.01) |

(52) U.S. Cl.
CPC .............. *G01L 1/26* (2013.01); *G01G 19/414* (2013.01); *G01G 19/52* (2013.01); *G01G 21/28* (2013.01); *G01G 23/00* (2013.01); *H04M 1/0254* (2013.01); *H04M 1/21* (2013.01); *H04M 2250/12* (2013.01)

(58) Field of Classification Search
CPC ............ G01G 3/12; G01G 3/13; G01G 3/14; G01G 19/52; G01G 21/28; G01G 21/283; G01G 19/414; G01G 23/01; G01G 23/3707; G01G 23/00; H04M 1/21; H04M 1/0254; H04M 1/026; H04M 1/72527; H04M 1/72522; H04M 2250/12; G01L 1/26
See application file for complete search history.

(56) References Cited

U.S. PATENT DOCUMENTS

| | | | |
|---|---|---|---|
| 3,478,830 A | 11/1969 | Levesque et al. | |
| 4,458,770 A | 7/1984 | Bucci | |
| 4,633,237 A * | 12/1986 | Tucknott et al. ...... | A61B 5/1117 340/525 |
| 4,799,558 A | 1/1989 | Griffen | |
| 5,276,432 A * | 1/1994 | Travis ................. | A61B 5/1115 177/144 |
| 5,347,092 A | 9/1994 | Buchs et al. | |
| 5,393,935 A * | 2/1995 | Hasty ................. | G01G 19/445 177/126 |
| 5,750,937 A * | 5/1998 | Johnson et al. ........... | 177/25.11 |
| 5,886,302 A | 3/1999 | Germanton et al. | |
| 5,929,391 A | 7/1999 | Petrucelli et al. | |

(Continued)

OTHER PUBLICATIONS

International Search Report and Written Opinion issued in related International Patent Application No. PCT/US2014/066280, mailed Feb. 12, 2015, 13 pages.

*Primary Examiner* — Randy W Gibson

(57) ABSTRACT

A weighing scale includes a platform supporting a load. Force transducers beneath the platform output respective transducer force signals of the load. An area sensor above the platform outputs area force signals of load forces applied to respective spatial areas of the platform. A processor is configured to determine the load's weight and location on the platform based on the transducer force signals and the area force signals. A method of weighing the load is also described. A method of monitoring the load includes measuring first transducer force signal(s) and first area force signal(s) of the load, and then repeatedly measuring second force signal(s) of the load using the transducer(s) or area sensor until the first and second signal(s) indicate a change in a weight or location of the load. A changed weight or changed location of the load is then determined using the measured second force signal(s).

7 Claims, 8 Drawing Sheets

(56) References Cited

U.S. PATENT DOCUMENTS

| | | | | |
|---|---|---|---|---|
| 6,133,837 A * | 10/2000 | Riley | A61B 5/1115 | 340/524 |
| 6,345,839 B1 * | 2/2002 | Kuboki | B60R 21/01516 | 280/735 |
| 6,348,663 B1 * | 2/2002 | Schoos | B60R 21/01516 | 280/735 |
| 6,417,466 B2 | 7/2002 | Gross et al. | | |
| 6,669,286 B2 * | 12/2003 | Iusim | A47C 31/126 | 297/217.4 |
| 6,918,612 B2 * | 7/2005 | Smith | B60R 21/01532 | 180/273 |
| 7,040,455 B2 * | 5/2006 | Bogat | | 186/61 |
| 7,043,997 B2 * | 5/2006 | Mattson | B60R 21/0153 | 280/735 |
| 7,126,065 B2 | 10/2006 | Petrucelli | | |
| 7,186,930 B1 * | 3/2007 | Wong et al. | | 177/25.13 |
| 7,460,938 B2 * | 12/2008 | Winkler | B60R 21/01516 | 180/273 |
| 7,547,851 B1 * | 6/2009 | Wong | | 177/25.13 |
| 7,656,299 B2 * | 2/2010 | Gentry | A61B 5/1113 | 340/562 |
| 7,897,884 B2 * | 3/2011 | Harish | G01G 7/06 | 177/144 |
| 8,315,823 B2 | 11/2012 | Berme et al. | | |
| 8,544,347 B1 | 10/2013 | Berme | | |
| 8,610,007 B2 * | 12/2013 | Chen | | 177/25.13 |
| 8,997,588 B2 * | 4/2015 | Taylor | G01L 1/00 | 73/862.041 |
| 9,091,585 B2 * | 7/2015 | Turner | | |
| 2005/0006151 A1 * | 1/2005 | Mattson | B60R 21/0153 | 280/735 |
| 2010/0307839 A1 | 12/2010 | Bradley | | |
| 2011/0175844 A1 | 7/2011 | Berggren | | |
| 2011/0242010 A1 * | 10/2011 | Chang et al. | | 345/173 |
| 2014/0020961 A1 * | 1/2014 | Luo et al. | | 177/25.15 |
| 2014/0089231 A1 * | 3/2014 | Jhunja et al. | | 705/407 |
| 2014/0224551 A1 * | 8/2014 | Turner | | 177/1 |
| 2015/0034396 A1 * | 2/2015 | Tchertkov et al. | | 177/1 |
| 2015/0201884 A1 * | 7/2015 | Ashokan | A61B 5/00 | |

* cited by examiner

DEVICES, SYSTEMS AND METHODS TO DETERMINE AREA SENSOR

TECHNICAL FIELD

This application relates generally to the field of electronic systems for measuring weights of loads, e.g., objects or persons.

BACKGROUND

There are many different types of electronic weighing scales (herein, "scales") in use today. One popular type of electronic weighing scale is constructed with a platform for receiving the load to be weighed and a set of levers, pivots, flexures, or torque tubes to mechanically combine the forces applied to the platform by the load, thereby enabling the measurement of these forces with a single electronic load cell, which operates as a force transducer. The load cell is typically constructed with a mechanically-deformable sensor plate with one or more sensor elements bonded thereto. When a load is applied to the load cell, the sensor plate mechanically bends and the sensor elements bonded thereto produce an electrical output signal, the magnitude of which is commensurate with the load applied to the load cell.

Another popular type of electronic weighing scale is constructed with a platform for receiving the load to be weighed, and a plurality of electronic load cells disposed at the corners of the platform, or more or less evenly spaced along the periphery or marginal periphery of the platform, that supports the platform. Each of the load cells produces an electrical output signal indicative of the load sensed thereby. The electrical output signals of the load cells are averaged by processing circuitry associated with the scale to enable the load to be measured over a large area of the platform. The load cells can detect load using, e.g., variable resistance or variable capacitance. For example, U.S. Publication No. 2010/0307839 by Bradley describes capacitive load cells at the corners of the scale.

Combinations of the above schemes have also been disclosed. U.S. Pat. No. 4,458,770 to Bucci, for example, describes a linkage that mechanically transfers forces from the four corners of the scale to four centrally-located capacitive load cells. However, this scheme combines the disadvantages of each of the above schemes without providing new capabilities.

One problem associated with the multi-load cell scale described immediately above is that when the load is unevenly positioned on the platform, the load or force sensed by each of the load cells is not the same, with a disproportionate amount of the load or force being sensed by certain ones of the load cells. Consequently, the associated processing circuitry arrives at a weight calculation that is offset from the load's "true weight" determined when the load is centrally or optimally positioned on the scale.

U.S. Pat. No. 7,126,065 to Petrucelli describes locating the center of mass of an object on the scale by triangulation based on readings from the load cells at the corner. However, this scheme can only estimate the location of the center of mass of whatever has been placed on the scale. If multiple objects are placed on the scale, such as a triangle of three oranges in contact with each other and with the scale, their center of mass may be located outside any of them.

SUMMARY OF THE DISCLOSURE

We have recognized that in certain contexts such as, for example, loading retail product packages with several different items that together form a product (e.g., a television, a stand, a remote control, and a power supply), it can be useful to determine whether all items have been added to the package. The above-referenced Bradley publication describes a counting scale that can count articles transferred relative to the scale, but the scheme of Bradley is limited to items that are relatively similar in weight. The scheme of Petrucelli can only locate center of mass. Even if center-of-mass information could indicate package loading for specific packages, if the position of the package on the scale changes, the moved center of mass would introduce inaccuracies into the determination of package loading.

Accordingly, we have recognized that there is a continuing need for a weighing scale capable of determining the position of a load or loads being weighed thereon that can be used in the above-noted context and in other areas such as diet management. In one embodiment, therefore, we have devised a weighing scale. The scale may include the following components:

a) a platform that supports a load to be weighed by the scale;

b) one or more force transducers arranged beneath the platform, each configured to output a transducer force signal of the load thereupon;

c) an area sensor arranged above the platform and configured to output a plurality of area force signals representative of forces applied to respective spatial areas of the platform by the load; and d) a processor configured to determine a weight of the load placed on the platform and a location of the load with respect to the platform based on the transducer force signals and the area force signals.

In another embodiment, we have devised a method of determining the weight of a load on a scale. The method can be achieved by:

receiving the load on an area sensor of the scale;

measuring the location of the load on the area sensor;

measuring a plurality of forces on respective force transducers supporting the area sensor;

automatically determining the weight of the load using a processor responsive to the measured location and the measured forces; and automatically determining a center of mass of the load using the measured forces.

In another embodiment, we have devised a method of monitoring a load. The method can be achieved by automatically performing the following steps using a processor:

receiving the load on an area sensor of the scale;

measuring one or more first transducer force signal(s) of the load using at least one force transducer, and measuring one or more first area force signal(s) of the load using an area sensor;

using a processor, measuring one or more second force signal(s) of the load using the at least one force transducer or the area sensor;

comparing the measured second force signal(s) to the first transducer force signal(s) or the first area force signal(s);

repeating the measuring-second-force-signal(s) and comparing steps until the comparison indicates a change in a weight or location of the load; and in response to the indication of a change, determining one of a changed weight or changed location of the load using the measured second force signal(s).

These embodiments exemplary of the present invention provide determination of the location of the load on the scale. This can provide improved accuracy in weighing or counting items on the scale. Various embodiments also permit weighing objects or other loads remote from the support of the scale.

Accordingly, in any of the embodiments described earlier, the following features may also be utilized in various combinations with the previously disclosed embodiments. For example, the scale can include a communications link, the processor further configured to transmit an indication of the determined location via the communications link. The processor can be further configured to monitor the force signals over time to detect a change in the weight of the load on the platform. The scale can include a computing device having the area sensor and a communications interface coupled to the processor, wherein the platform removably retains the computing device. The computing device can include a display screen associated with the area sensor and the processor further adapted to operate the computing device via the communications interface to present on the display screen a visual indication corresponding to the load. The force transducers and the area sensor can be arranged in respective, laterally-spaced regions. The respective regions can be spaced apart vertically. The platform can include respective portions corresponding to the laterally-spaced regions and a transverse portion connecting the respective portions. The platform can include a conveyor configured to support the load.

In various examples, the method of weighing can include the measuring-location step including receiving respective load signals from the area sensor for a plurality of areas thereof. The method can include automatically determining a respective force for each of the load signals using that load signal and the measured plurality of forces; automatically determining a weight distribution using the measured plurality of forces; and comparing the weight distribution to the load signals to determine an accuracy level of the weight determination. The method can include comparing the determined accuracy level to a selected acceptable range and automatically providing a warning if the determined accuracy level is not within the selected acceptable range. The step of providing a warning can include automatically determining, using the measured forces, a portion of the area sensor corresponding to the load; and presenting, on a display screen associated with the area sensor, a visual indication of the determined portion.

In various examples, the method of monitoring can include determining a weight or location of the load using the measured first transducer force signal(s) and the measured first area force signal(s) and comparing the weight and the location to the changed weight and the changed location to determine a change in weight or location of the load. The comparing can include determining a difference between the second force signal(s) measured using the at least one force transducer and the first transducer force signal(s), and indicating a change when the difference is outside a selected dead band. The comparing can include determining a center of mass using the first transducer force signal(s), determining a second center of mass using the second force signal(s) measured using the at least one force transducer, and indicating a change when a difference between the center of mass and the second center of mass is outside a selected dead band. The comparing can include automatically determining a difference between the second force signal(s) measured using the area sensor and the first area force signal(s) and indicating a change when the difference moves outside a selected dead band within a selected time range. The comparing can include automatically determining a time series of first differences between the second force signal(s) measured using the at least one force transducer and the first transducer force signal(s); automatically determining a time series of second differences between the second force signal(s) measured using the area sensor and the first area force signal(s); and indicating a change when a deviation in the time series of first differences is temporally correlated with a deviation in the time series of second differences.

In the aforementioned aspects of the disclosure, the steps of measuring location, measuring forces, determining weight, determining center of mass, measuring first force signal(s), measuring second force signal(s), comparing, repeating, and determining-changed-weight-or-location, may be performed be an electronic circuit or a processor. These steps may also be implemented as executable instructions stored on a computer readable medium; the instructions, when executed by a computer may perform the steps of any one of the aforementioned methods.

In additional aspects of the disclosure, there are computer readable media, each medium comprising executable instructions, which, when executed by a computer, perform the steps of any one of the aforementioned methods.

In additional aspects of the disclosure, there are devices, such as bathroom scales, commercial or industrial scales, smartphones, or tablet computers, each comprising an electronic circuit or processor configured to perform the steps of any one of the aforementioned methods.

These and other embodiments, features and advantages will become apparent to those skilled in the art when taken with reference to the following more detailed description of various exemplary embodiments of the invention in conjunction with the accompanying drawings that are first briefly described.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention. For the sake of clarity, like reference numerals herein represent like elements.

DETAILED DESCRIPTION

The following detailed description should be read with reference to the drawings, in which like elements in different drawings are identically numbered. The drawings, which are not necessarily to scale, depict selected embodiments and are not intended to limit the scope of the invention or the attached claims.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values not at least ±10% of the recited value, e.g.

"about 90%" may refer to the range of values from 81% to 99%. Also throughout the course of discussion, ranges or intervals are denoted using square brackets for closed endpoints and parentheses for open endpoints, as is conventional in the mathematical art. The terms "above" and "below" are not limiting as regards absolute orientation; a scale as described herein can be turned on its side or upside down without changing the above and below relationships described herein.

As used herein, the phrase "electrical signal" or "signal" is intended to include direct current signal, alternating signal or any signal within the electromagnetic spectrum. The terms "processor"; "microprocessor"; or "microcontroller" are intended to have the same meaning and are intended to be used interchangeably.

Various aspects described herein generally relate to scales that have a small number of force transducers, e.g., at the corners, for determining the weight of a load placed on the scale. The scale also includes a touchscreen or other area sensor onto which the load is placed. Area-sensor data are used to determine where the load is on the scale. That location data can then be used to correct for any non-idealities in the load sensors when under asymmetrical loads. The area-sensor data can also be used to more accurately detect gradual changes in the weight of a load on the scale.

Figure 1:
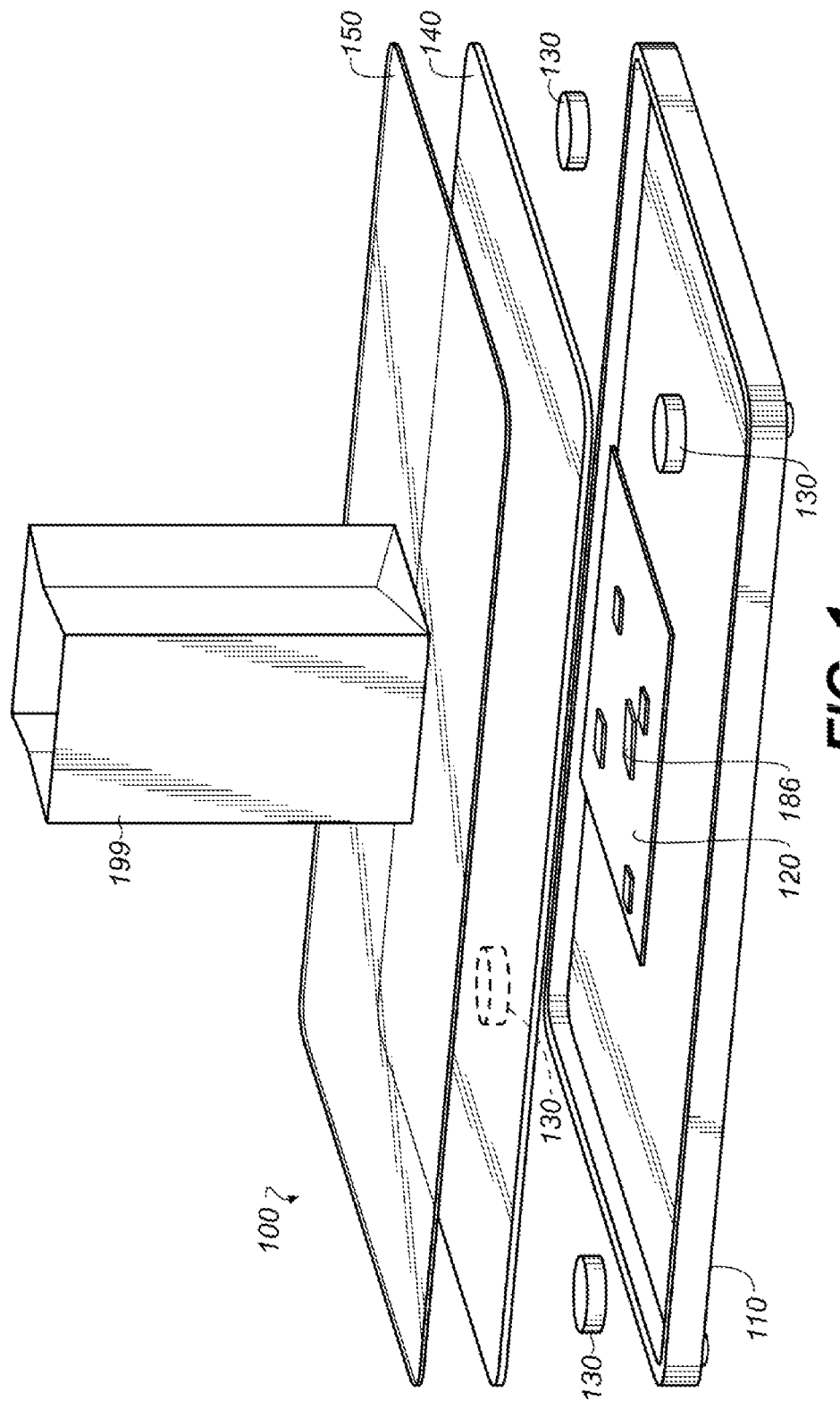
FIGS. 1-3 are perspective views of exemplary weighing scales.

FIG. 1 is a perspective view of an exemplary electronic weighing scale 100 for weighing a load 199, e.g., a bag of diamonds, popcorn, or both. A housing 110 generally contains appropriate electronics 120, and can include a set of compliant feet or other structures to oppose lateral motion of the scale or permit the scale to be used on non-flat surfaces. Though a housing 110 is specifically shown according to this exemplary embodiment, this structure is optional, as will be discussed below. A plurality of force transducers 130 are attached to the underside of a platform 140, e.g., in a symmetrical or evenly-spaced arrangement, to support the platform 140 above the housing 110 or a ground, floor, table, or base-like surface in a stable manner. In the example shown, the platform 140 is defined by a square or rectangular configuration including four (4) force transducers 130 attached to the corners thereof. Alternatively, the platform can be defined by any suitable planar configuration, including a circular, elliptical, oval, triangular, octagonal, or other polygonal configuration. The force transducers 130 can be suitably arranged beneath the platform and can be distributed across the platform or concentrated only in a portion thereof. Any number of force transducers 130 can be used. In various alternative embodiments, the scale 100 includes exactly one force transducer 130, e.g., arranged under the center of the platform 140; or a plurality of force transducers 130 arranged in a line under the platform 140. An area sensor 150 can be arranged over the platform 140. The area sensor 150 can cover substantially the entire upper surface of the platform 140, as in the example shown. Alternatively, the area sensor 150 can be arranged over a portion of the platform 140. That portion can be, e.g., inset laterally within the force transducers 130 when the scale 100 is viewed from above.

Each of the force transducers 130 according to this embodiment includes a load cell (not shown) positioned to sense a portion of the force or pressure exerted by a load 199 (against the platform 140, which supports the load to be weighed by the scale 100. Each of the force transducers 130 can also include mechanical support structures for the respective load cell and features to retain the force transducer 130 in position with respect to the platform 140, the housing 110 or both. The load cells are typically located below the platform 140. Each of the load cells outputs an electrical signal, referred to herein as a transducer force signal, in response to a portion of the load placed on the platform 140. Electronics 120 include components that convey the electrical signals from the load cells in the force transducers 130 to a locally disposed processor 186. For example, electronics 120 can include analog-to-digital converters to receive the respective electrical signals from respective ones of the load cells and provide corresponding digital data to the processor 186. Exemplary load cells are described in U.S. Pat. No. 5,929,391 entitled "Load Cell for an Electrical Weighing Scale", U.S. Pat. No. 6,417,466 entitled "Load cell with Bossed Sensor Plate for an Electrical Weighing Scale", and U.S. Pat. No. 5,886,302 entitled "Electrical Weighing Scale", each of which is incorporated herein by reference.

Still referring to FIG. 1, the scale 100 also includes an area sensor 150. The area sensor can be, e.g., a resistive or capacitive touch sensor such as can be used with a touchscreen. The area sensor 150 also provides data to the processor 186 via the electronics 120. The electronics 120 can be mounted on the housing 110, or, if the housing 110 is not used, on the underside of the platform 140. As shown, the area sensor 150 is arranged above the platform 140 and optionally affixed thereto, and is configured to output a plurality of area force signals representative of forces applied to respective spatial areas of the platform by the load. The processor 186 is configured to determine a weight of the load 199 placed on the platform 140 using the transducer force signals and the area force signals. In various aspects, the processor 186 is further configured to determine a location of the load 199 with respect to the platform 140 using the force signals from the area sensor 150, as is discussed below. In at least one exemplary embodiment, the housing 110 can be the housing of a computing device 255, FIG. 2, and the area sensor 150 and the platform 140 can be included in a touchscreen 250, FIG. 2, which is described in more detail below with reference to FIG. 8. In the herein-contemplated exemplary computing device, the touchscreen is mounted to one or more force transducer(s) instead of to the housing or chassis of the computing device. This permits directly using the computing device as a scale.

In various aspects, the area sensor 150 is wholly or substantially force-insensitive. For example, some conventional resistive matrix touchscreens and capacitive touchscreens only detect the location of a touch, not the pressure or force exerted by the touching object. In other aspects, the area sensor 150 is force or pressure-sensitive. For example, U.S. Publication No. 2011/0175844 describes a touchscreen including pressure-sensitive elements associated with capacitive touch-sensitive electrode elements to sense whether the cover layer is touched and also the pressure on the pressure-sensitive element resulting from the force of the touch. Either type of area sensor 150 can be used as discussed herein.

Some conventional resistive and capacitive area sensors 150 provide a readout voltage that peaks shortly after a force is applied and has a magnitude correlated with the magnitude of the applied force. After the peak, the readout signal drifts or decays. In a capacitive sensor, this can be due to self-discharge of the capacitors. According to at least one embodiment and as discussed herein, the electronics 120 or the processor 186 can include peak-hold circuits to record the magnitude of the peak of the readout voltage. This circuit can permit improved detection of the relative magnitudes of different forces on the area sensor 150 even with low-cost sensors. A second peak after a first peak has been seen in a particular area of the area sensor/platform can indicate that an additional item was added on top of an existing item, increasing the force. Particularly when objects are dropped onto the scale, detecting subsequent peaks in readout voltage can advantageously provide information about objects not directly in contact with the scale 100. This peak-hold behavior limits prior schemes in that, to accurately weigh an object with such a device, the object would have to be dropped from a fixed height onto the sensor. The use of the area sensor 150 together with the force transducers 130 permits the scale 100 to determine the weight of objects that are at rest on the scale 100.

In an example, the scale 100 is used as an aid to persons controlling or monitoring their diets, e.g., persons with Type 2 diabetes. When a plate of food is set on the scale 100, the distribution of force of the plate on the scale 100 indicates the distribution of food on the plate. As food is eaten, the weight and distribution will change. Those changes can be monitored, e.g., as discussed below with reference to FIGS. 5 and 7.

In other examples, the scale 100 is food-safe and is used as the plate. The scale 100 can include a coating (not shown) approved for serving food for human consumption. The coating can be arranged over the area sensor 150. Alternatively, the area sensor 150 can include food-safe materials or a food-safe coating so that a person can eat directly off the area sensor 150. In these examples, the scale 100 can directly detect each piece of food and determine how much was eaten of each food in a meal.

In another example, the scale 100 can be used to measure inventory on hand during product manufacturing. For example, a number of parts can be placed on the scale, and then removed from the scale as products are manufactured. The scale 100 can determine, using the area sensor 150, which part(s) have been removed. Using the force transducers 130 and the area sensor 150, the processor 186 can count the number of products on the scale 100 or the number that have been removed therefrom. Moreover, when the scale 100 is being loaded with parts or widgets, the changes in weight and location can be monitored to confirm that the proper widget is being placed in the proper location on the scale 100. Similarly, the scale 100 can be used to detect defects in the size, shape, or weight of parts to be used in manufacturing or finished parts to be packed and shipped.

In another example, the scale 100 can be used when packing items for shipment or for retail sale. Using the force transducers 130 and the area sensor 150, the processor 186 can readily identify the shapes and weights of objects, regardless of the location of those objects on the scale 100.

In another example, the scale 100 can be used as a controller for a game, such as an interactive hybrid physical-virtual game. In one version, physical game pieces can be placed on the scale 100, and the movements and identities of these pieces can be tracked by measuring location data and mass data, respectively. Changes in the center of mass can be monitored as a cross-check with the data from the area sensor 150. Similarly, increases in force without a change in the center of mass or the distribution of force on the area sensor 150 can indicate that objects have been stacked on top of the load 199. In another example, the scale 100 can be used as a touchscreen interface for a computer or mobile device so both pressure and location of touches can be detected.

In aspects using force-insensitive area sensors 150, the processor 186 processes the signals from the force transducers 130 to estimate the forces in regions of the area sensor 150 that are under load. In aspects using force-sensitive area sensors 150, the processor 186 can read forces directly from the area sensor 150. The processor 186 can combine data from the force transducers 130 and the area sensor 150, e.g., as discussed below with reference to FIGS. 4-8, regardless of whether the area sensor 150 is force-sensitive.

Figure 2:
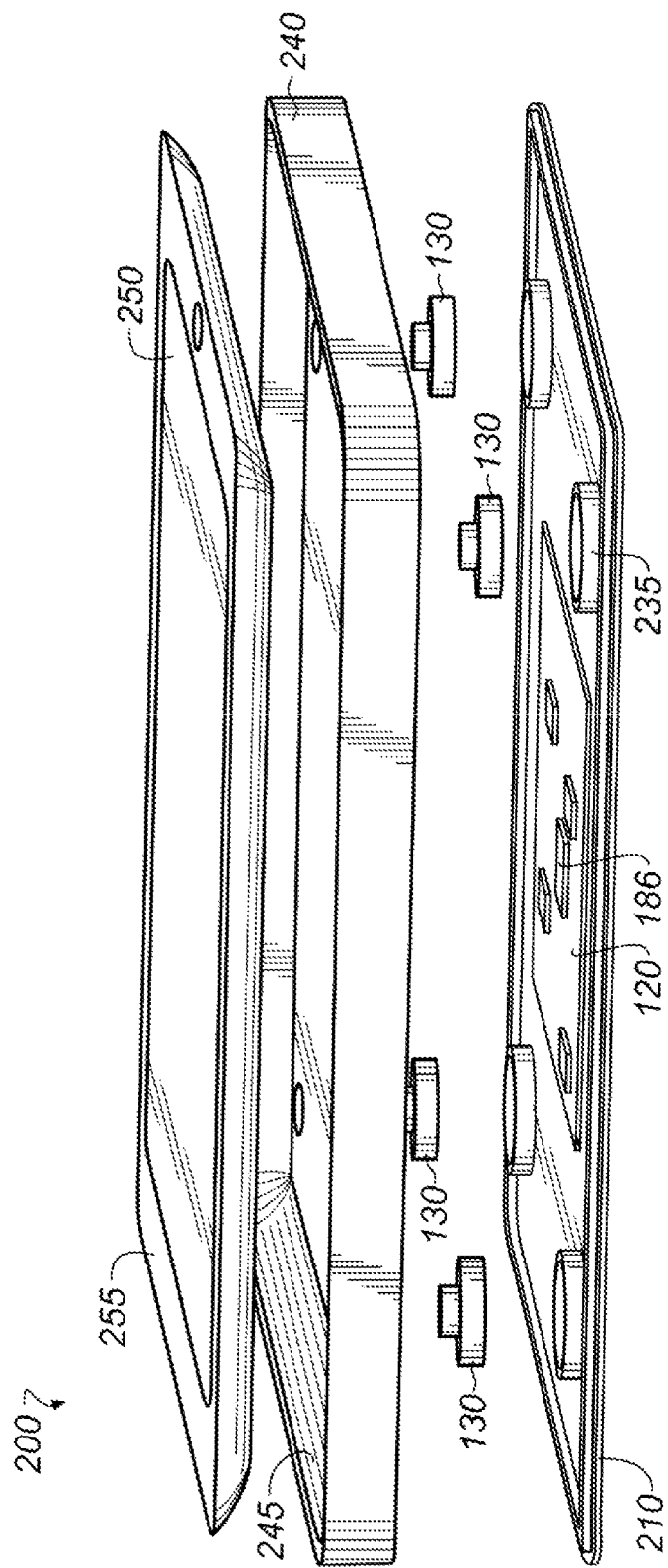

FIG. 2 is a perspective view of another exemplary weighing scale 200. For purposes of this discussion and clarity, similar parts are labeled herein with the same reference numbers. A housing 210 supports the remaining components of the scale 200 wherein the housing 210 is optional, as previously discussed regarding the prior embodiment. As shown, the housing 210 can be configured so that it does not enclose other components of the scale 200; it can also be configured to surround such components, similar to the housing 110, FIG. 1. The housing 210 can include a plurality of transducer mounts 235 on an upper surface that are configured to receive a corresponding number of force transducers 130 supporting the platform 240.

Over an intermediately disposed platform 240, and preferably attached thereto, is a device holder 245. The device holder 245 is shaped or otherwise configured to removably retain a computing device 255. The computing device 255 can be, e.g., an electronic tablet or smartphone, or a laptop computer with a fold-back touchscreen. In an example, the computing device 255 is an APPLE IPAD. The computing device 255 includes a touchscreen 250, e.g., a resistive or capacitive touchscreen, that includes an area sensor (for clarity, not labeled in this figure; see display 850, FIG. 8). The computing device 255 also includes a communications interface, wired or wireless, for communicating with the processor 186, e.g., to report data from the area sensor or to receive information from the processor 186 to display on the touchscreen.

Figure 3:
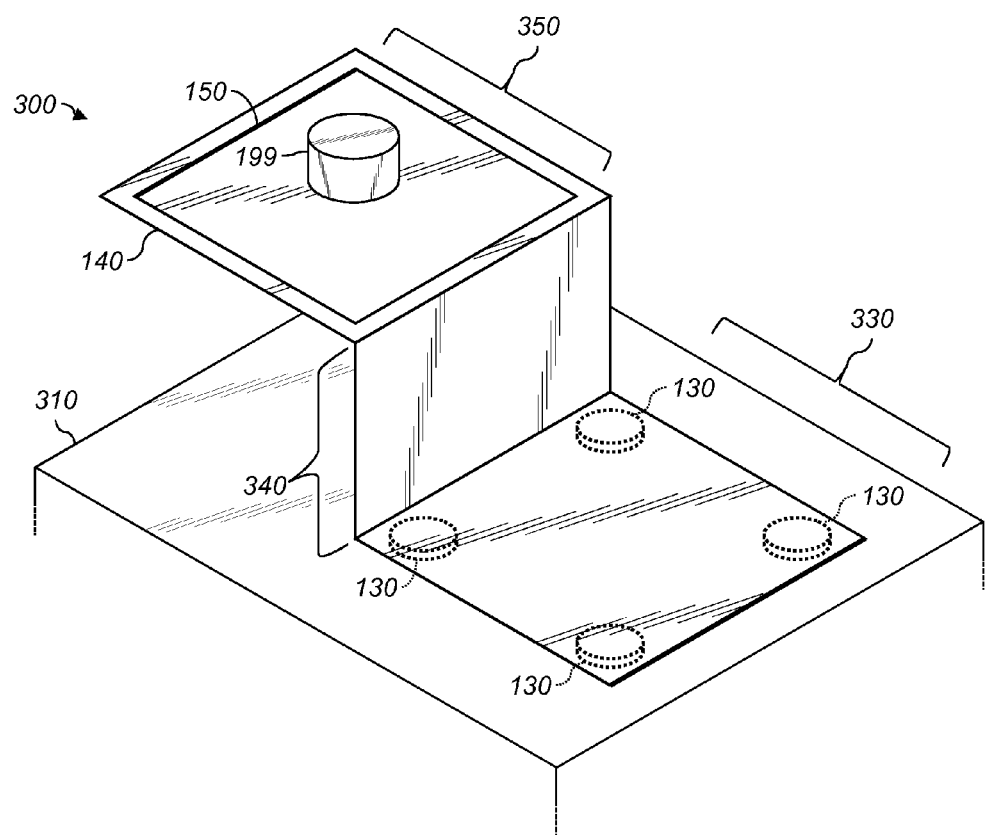

FIG. 3 is a perspective view of an exemplary scale 300. The scale 300 is mounted on a supporting surface 310, e.g., a table. A set of force transducers 130 connect a platform 140 to the supporting surface 310. As shown, the force transducers 130 and an area sensor 150 are arranged in respective, laterally-spaced regions 330, 350. The exemplary platform 140 includes respective horizontally-oriented portions corresponding to the regions 330, 350. According to this example, the area sensor 150 is cantilevered off the force transducers 130 wherein the platform 140 includes a transverse portion 340 between the regions 330, 350 (and their corresponding portions of the platform 140) supporting the parallel, but laterally arranged area sensor 150, and supporting force transducers 130. This design permits the scale 300 to be used in very thin spaces and other spaces without significant free volumes for the scale 300 or a load 199. In these embodiments, the processor 186, FIG. 1, is configured to compute lever equations using the position of the load 199 as detected by the area sensor, the known geometry of the scale 300, and the forces measured by the force transducers 130. The processor 186 performs these computations to compensate for the change in force measured by the force transducers 130 as the load 199 moves closer to the force transducers 130 (measured force decreases) or farther from the transducers (measured force increases). This advantageously permits the processor 186 to compute the weight of the load 199 regardless of the position of the load 199 on the area sensor 150.

In other version, the regions 330, 350 can be laterally spaced and coplanar (e.g., arranged in a line or on a diagonal). In other embodiments, such as this exemplary version, the regions 330, 350 are also spaced apart vertically. This provides further options for designing a scale 300 that will fit a particular space.

In various aspects, the platform 140 includes other components in addition to the area sensor 150. In an example, the platform 140 can include a conveyor (not shown), e.g., a conveyor belt, roller conveyor, or omni-wheel conveyor, configured to support a load. The conveyor belt can be cantilevered off the force transducers 130 in a manner similar to that shown in FIG. 3. The platform portion holding the conveyor belt can also be supported at both ends by force transducers 130, e.g., two on each end. The area sensor 150 can be disposed on top of the belt, or can be under the belt with bearings being provided to permit the conveyor belt to move and simultaneously transmit force to the area sensor 150. The processor 186 is configured to determine, e.g., mass on the conveyor belt and center of mass of the conveyor belt. As long as the conveyor belt carries constant-mass loads (e.g., individual objects) at constant spacing and constant speed, the mass and center of mass will vary within only a narrow range. Deviations from that range can indicate, e.g., that the wrong item was placed on the conveyor belt, an item was missed, or the items are too close together or too far apart.

Figure 4:
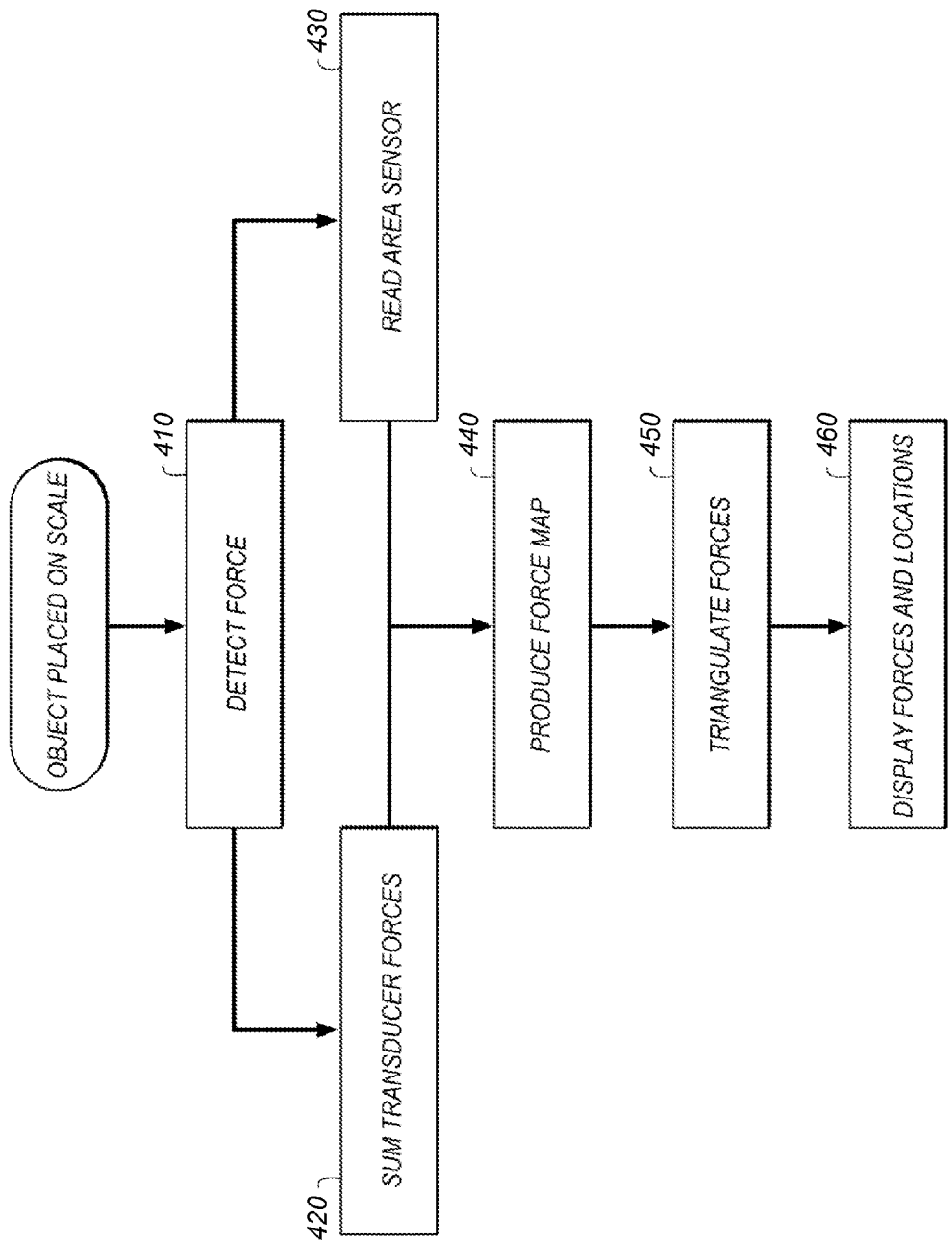
FIG. 4 is a flowchart illustrating an exemplary method for weighing a load.

FIG. 4 is a flowchart illustrating an exemplary method for weighing a load in accordance with the scale designs discussed herein. For clarity of explanation, reference is herein made to various components shown in FIGS. 1-3 that can carry out or participate in the steps of the exemplary method. It should be noted, however, that other components can be used; that is, exemplary method(s) shown in FIG. 4 are not limited to being carried out by the identified components. The steps can be performed in any order except when otherwise specified, or when data from an earlier step is used in a later step. In at least one example, processing begins with step 410 when or after a load is placed on the scale 100, 200.

In step 410, forces are detected using the force transducers 130 and the area sensor 150.

In step 420, the forces measured at the force transducers 130 are summed to provide a total force.

In step 430, the area sensor 150 is read by the processor 186. Spatial variations in the resistance or capacitance (for example) of the area sensor 150 indicate spatial variations in the force applied to the area sensor 150. As discussed above, area sensor 150 can indicate the amount of force or pressure in specific areas, or can indicate merely whether the force or pressure exceeds a threshold (force-insensitive).

In step 440, a force map is produced. The measured and summed forces from the force transducers 130 are combined with the data from the area sensor 150 to provide a spatial map of forces on the upper surface of the scale 100 or other surface configured to hold the load 199. In an example, the area sensor 150 is force-sensitive or provides peak-hold force information, as discussed above. The relative forces from the area sensor 150 are scaled so that the sum of those forces equals the total force measured by the force transducers 130. This scaling can be performed before triangulation. Corrections can be applied before or after scaling based on the location of the load 199 on the area sensor 150, e.g., based on factory calibration data indicating the measurement accuracy of the force transducers 130 as the force moves off-axis. Triangulation can optionally be performed to determine the center of mass of the load 199 using the data from the force transducers 130.

In optional step 450, the measured forces from the force transducers 130 are triangulated. This triangulation step permits refinement of the force map, e.g., by determining the center of mass of the load 199 and adjusting the force-map data so that the center of mass implied by the force-map data is consistent with the triangulated center of mass. In various alternative embodiments, triangulation is not performed. For example, the scale 100 can include only a single force transducer 130, e.g., arranged at the lateral center of the platform 140. Instead of triangulating, the location of the load 199 can be determined using the data from the area sensor 150. This advantageously permits correcting for off-center load effects without requiring a plurality of force transducers 130.

In step 460, the forces and locations in the force map are displayed or otherwise communicated, e.g., to a user of the scale 100. The force map can additionally or alternatively be stored, e.g., in a storage system 840, FIG. 8.

Figure 5:
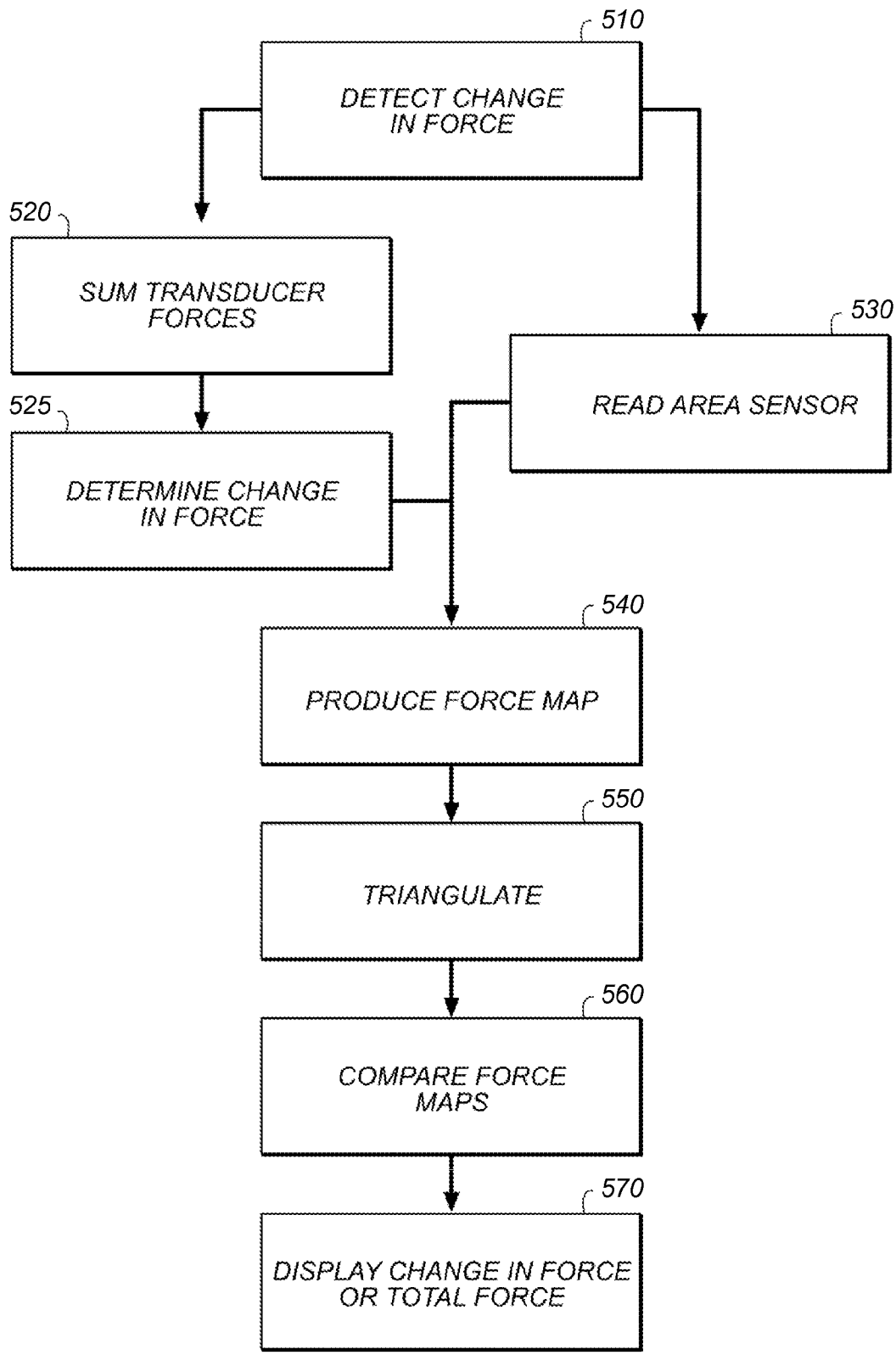
FIG. 5 is a flowchart illustrating an exemplary method for determining changes in the weight of a load.

FIG. 5 is a flowchart illustrating an exemplary method for determining changes in the weight of a load. As in the preceding, the scales 100, 200 can be used for purposes of carrying out this method or variants thereof. The steps can be performed in any order except when otherwise specified, or when data from an earlier step is used in a later step. In at least one example, processing begins with step 510, e.g., when a load has been on the scale 100 for a selected period of time.

In step 510, a change in force is detected. The change in force can be a change in the force detected by any of the force transducers 130 or in the pattern of forces or measured forces or pressures from the area sensor 150. The processor 186 can poll the force transducers 130 or the area sensor 150, or can respond to interrupts from controller(s) monitoring or otherwise operating the force transducers 130 or the area sensor 150.

In step 520, the forces from the force transducers 130 are summed to determine a total force exerted by the load. In step 525, a change in force is determined, e.g., by comparing the sum from step 520 to a sum of measurements recorded at an earlier time.

In step 530, the area sensor is read. The resulting data are correlated with the force applied to various portions of the extent of the area sensor 150.

In step 540, a force map is produced using the measurements collected after step 510 of the force transducers 130 and of the area sensor 150. This can be done as described above with reference to FIG. 4.

In optional step 550, triangulation or other computations are performed using the measurements from the force transducers 130 to determine a center of mass of the load. This can be done as described above with reference to FIG. 4.

In step 560, the force map is compared to a force map based on previously-measured data. The processor 186 automatically determines a change in weight or location of the load using the force maps before and after the detection of the change (step 510).

In optional step 570, the new forces or force map, or the change in force or in the force map, are displayed, e.g., on the touchscreen 250.

Figure 6:
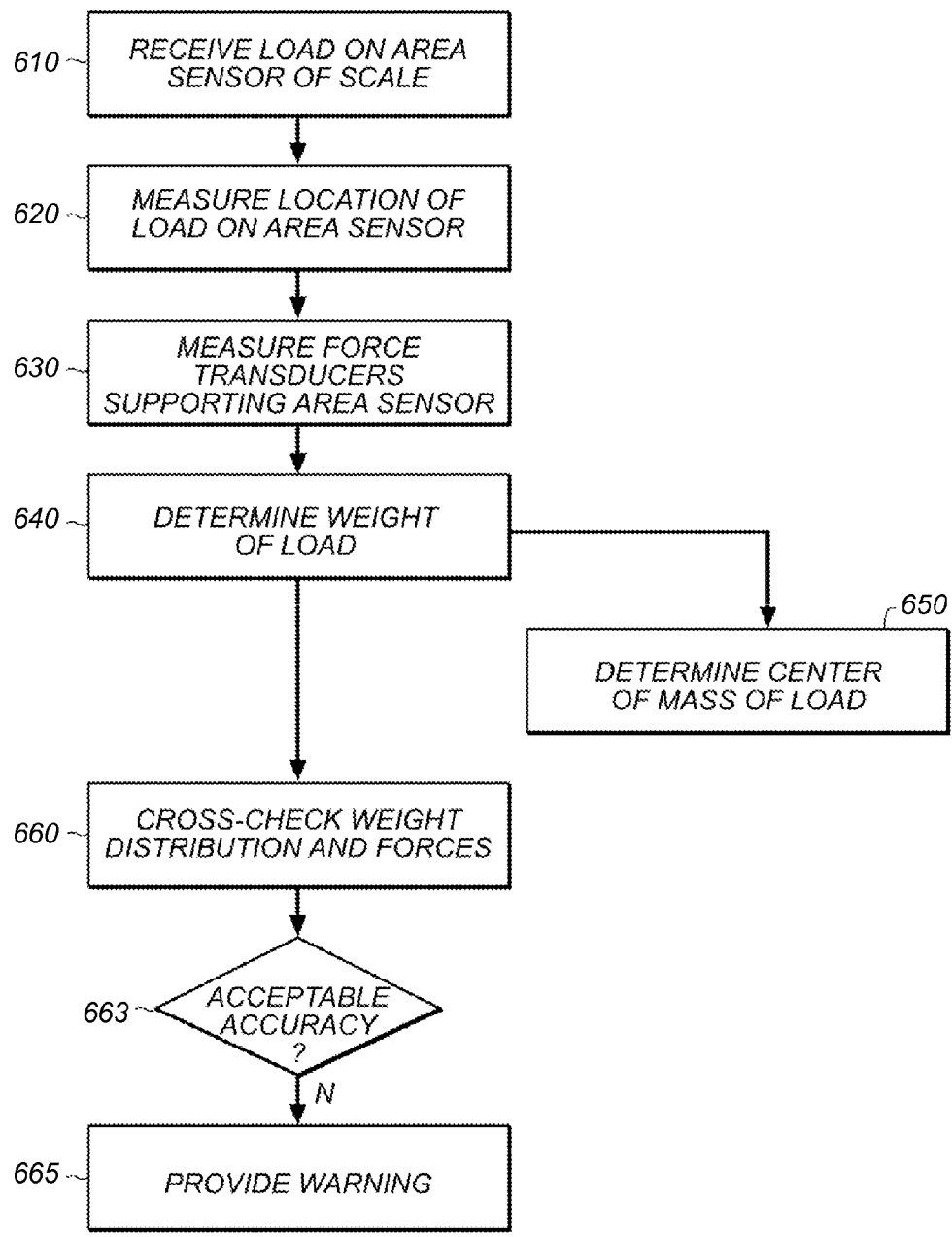
FIG. 6 is a flowchart illustrating an exemplary method for determining the weight of a load on a scale.

FIG. 6 is a flowchart illustrating an exemplary method for determining the weight of a load on a scale such as scale 100, 200 or a variant thereof. The steps can be performed in any order except when otherwise specified, or when data from an earlier step is used in a later step. In at least one example, processing begins with step 610.

In step 610, the load is received on an area sensor 150 of the scale 100.

In step 620, the location of the load on the area sensor 150 is measured. This can be done as described above. Step 620 can include receiving respective load signals from the area sensor for a plurality of areas thereof, as is discussed below with reference to step 660. The load signals can be, e.g., signals from respective pixels of a resistive or capacitive area touch sensor.

In step 630, a plurality of forces on respective force transducers supporting the area sensor 150 are measured. This can be done as described above. In an example, there are at least three (3) force transducers 130.

In step 640, the weight of the load is automatically determined using the processor 186 responsive to the measured location and the measured forces.

Conventional gait scales, such as are used by custom shoe fitters or athletic trainers, show the pressure exerted by the foot using a large number of piezoelectric force transducers. Such transducers can be expensive, and can be limited in resolution based on the size of the force transducers. In contrast, the area sensor 150 as described herein can include a plurality of individual force-detecting elements that are fabricated using microelectronic processes. The scale 100 can therefore be less expensive and higher-resolution than prior gait scales. Step 640 can advantageously include determining the weight of the load even if the area sensor 150 is not calibrated to physical units (e.g., newtons of force or pascals of pressure).

Step 640 can also include providing a force map, as described above with reference to steps 440, 540. The force map can be represented graphically as a heatmap colored, e.g., red for high forces and blue for light forces.

In various aspects, step 640 is followed by step 650. In step 650, a center of mass of the load is automatically determined using the measured forces. This can be done using triangulation as described in various references cited herein.

In various aspects, step 640 is alternatively or additionally followed by step 660. Step 660 and subsequent steps describe methods by which the processor 186 cross-checks the weight distribution with the measured force. This advantageously permits determining when the load is positioned on the scale 100 in an arrangement that may reduce the accuracy of the weight measurement.

In step 660, the processor 186 automatically determines a respective force for each of the load signals from step 620. Each force is determined using the corresponding load signal and the measured plurality of forces. This step advantageously provides weight, e.g., in newtons, without requiring the area sensor 150 to be calibrated. This step can be performed even if steps 663, 665 are not performed. Also in step 660, a weight distribution is automatically determined using the measured plurality of forces.

In decision step 663, the weight distribution is compared to the load signals to determine an accuracy level of the weight determination. In an example, a load hanging over the edge of the scale 100, or more specifically protruding past the lateral extent of the platform 140, can exert a torque on the scale 100. The torque can cause inaccurate results, because the lever principle provides that the force experienced varies along the length of a lever. (An example of a use of this principle is discussed above with reference to FIG. 3.) If the weight distribution indicates that the area sensor 150 is not indicating significant pressure along one edge of the platform 140, but the load signals indicate that the force transducers 130 adjacent to that edge are experiencing significantly higher load than others of the force transducers 130, the processor 186 can determine that the load is likely overhanging that edge. In this situation, the accuracy determination of the weight distribution can be low.

In various aspects, in decision step 663, the determined accuracy level is compared to a selected acceptable range. Continuing the example above, the determined accuracy level can be the lateral Cartesian distance between a peak of the forces from the area sensor 150 and the triangulated center of mass determined using data from the force transducers 130. The farther apart these points are, the more likely an inaccuracy is present. Accordingly, the selected acceptable range can be a distance range, e.g., from approximately 0% to approximately 10%, inclusive, of the diagonal of the area sensor 150. If the determined accuracy level is not within the selected acceptable range, the next step is step 665.

In step 665, the processor 186 provides a warning that the determined accuracy level is not within the selected acceptable range. Step 665 can include automatically determining, using the measured forces, a portion of the area sensor corresponding to the load. A visual indication of the determined portion can then be presented on a display screen associated with the area sensor. This highlights an area where a problem may be occurring, assisting users in rapidly correcting load arrangements that may reduce measurement accuracy.

Figure 7:
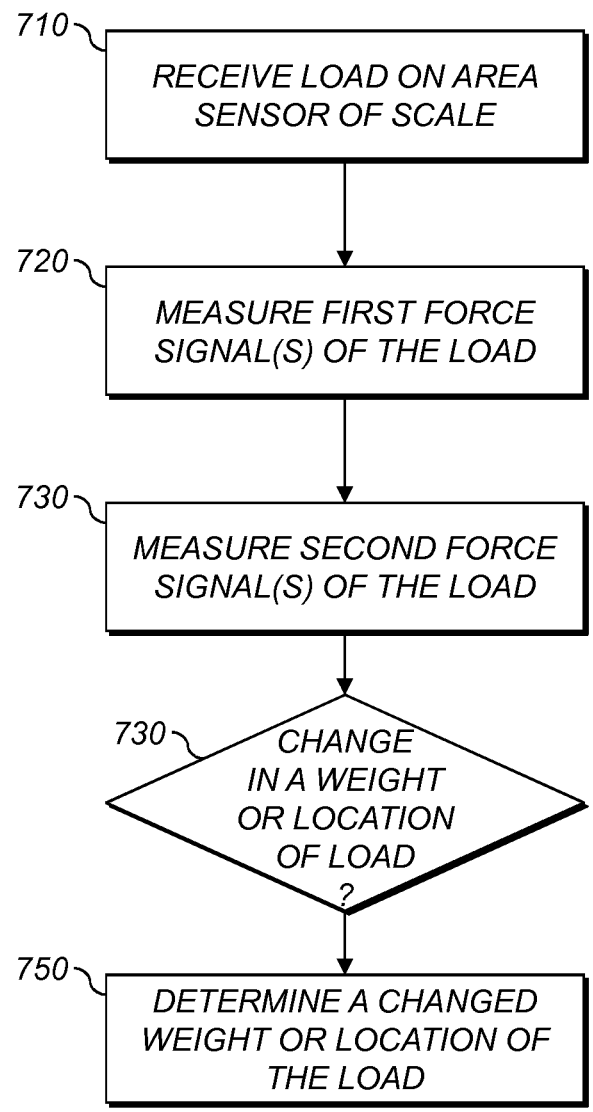
FIG. 7 is a flowchart illustrating an exemplary method for monitoring a load.

FIG. 7 is a flowchart illustrating an exemplary method for monitoring a load using a scale 100, 200 or a variant thereof. The steps can be performed in any order except when otherwise specified, or when data from an earlier step is used in a later step. In at least one example, processing begins with step 710. In various embodiments described herein, the processor 186 is further configured to monitor the force signals from the force transducers 130 and the area sensor 150 over time to detect a change in the weight of the load 199 on the platform 140.

In step 710, the load is received on an area sensor of a scale.

In step 720, one or more first transducer force signal(s) of the load are measured using at least one force transducer 130, and one or more first area force signal(s) of the load are measured using the area sensor 150.

In step 730, using a processor 186, one or more second force signal(s) of the load are measured using the at least one force transducer 130 or the area sensor 150.

In decision step 740, the processor 186 compares the measured second force signal(s) to the first transducer force signal(s) or the first area force signal(s) to determine whether a weight or location of the load has changed. If not, the next step is step 730. If so, the next step is step 750. In this way, the measuring-second-force-signal(s) step 730 and the comparing step 740 are repeated until the comparison indicates a change in a weight or location of the load. Ways of performing this comparison are discussed below that can be used individually or in any combination.

In step 750, in response to the indication of a change, the processor 186 determines one or both of a changed weight or changed location of the load using the measured second force signal(s). The processor 186 can also determine a (pre-change) weight or location of the load using the measured first transducer force signal(s) and the measured first area force signal(s). The processor 186 can then compare the (pre-change) weight and the location to the changed weight and the changed location to determine a change in weight or location of the load.

In various aspects, decision step 740 includes determining a difference between the second force signal(s) measured using the at least one force transducer and the first transducer force signal(s), and indicating a change when the difference is outside a selected dead band. As discussed above, the data from the area sensor 150 can drift over time. However, the signals from the force transducers 130 can be stable. Accordingly, an appreciable (outside dead band, e.g., more than ±10%) change in the signals detected by the force transducers 130 can indicate that the mass of the load has changed.

In other aspects, decision step 740 includes determining a center of mass using the first transducer force signal(s), determining a second center of mass using the second force signal(s) measured using the at least one force transducer, and indicating a change when a difference between the center of mass and the second center of mass is outside a selected dead band. This also reduces the probability of mis-identifying a change due to drift. When the center of mass has moved by, e.g., more than 10% of the diagonal of the platform 140, it is likely that the load has moved, or that mass has been added or removed.

In still other aspects, decision step 740 includes automatically determining a difference between the second force signal(s) measured using the area sensor 150 and the first area force signal(s) and indicating a change when the difference moves outside a selected dead band within a selected time range. Even though the area sensor 150 is subject to drift, faster changes are less likely to be related to drift than slower changes. A sudden increase in detected force in a small portion of the area sensor 150 likely indicates that additional load has been placed on the scale 100.

In yet other aspects, the sensors are used together. For many situations, change in the total load is correlated with changes in the distribution of mass of the load. Accordingly, the decision step 740 can include automatically determining a time series of first differences between the second force signal(s) measured using the at least one force transducer and the first transducer force signal(s). This can be, e.g., a graph of force versus elapsed time. Decision step 740 also includes automatically determining a time series of second differences between the second force signal(s) measured using the area sensor and the first area force signal(s). This can be a time series of 2-D images representing the distribution of load on the area sensor 150. Decision step 740 can indicate a change when a deviation in the time series of first differences is temporally correlated with a deviation in the time series of second differences. In an example, if the data from the area sensor 150 show a force increase in a selected region at substantially the same time as the data from the force transducers 130 show a force increase, it is likely that more mass has been added to the load. These aspects can advantageously permit distinguishing between rapid drift, which only changes the data from the area sensor 150, and removing mass from the load, which changes data from both sources.

In several of these aspects, decision step 740 includes presenting on a display screen associated with the area sensor 150, a visual indication of the deviation in the time series of second differences. For example, when mass is added to or removed from the load in a particular location, a pattern of ripples in a pond around the location of that mass on the scale 100 can be displayed to show the effect. Other visual effects described above can alternatively be used. The inclusion of these visual indications to a user can advantageously confirm to a user that the addition or removal of mass has been detected.

Figure 8:
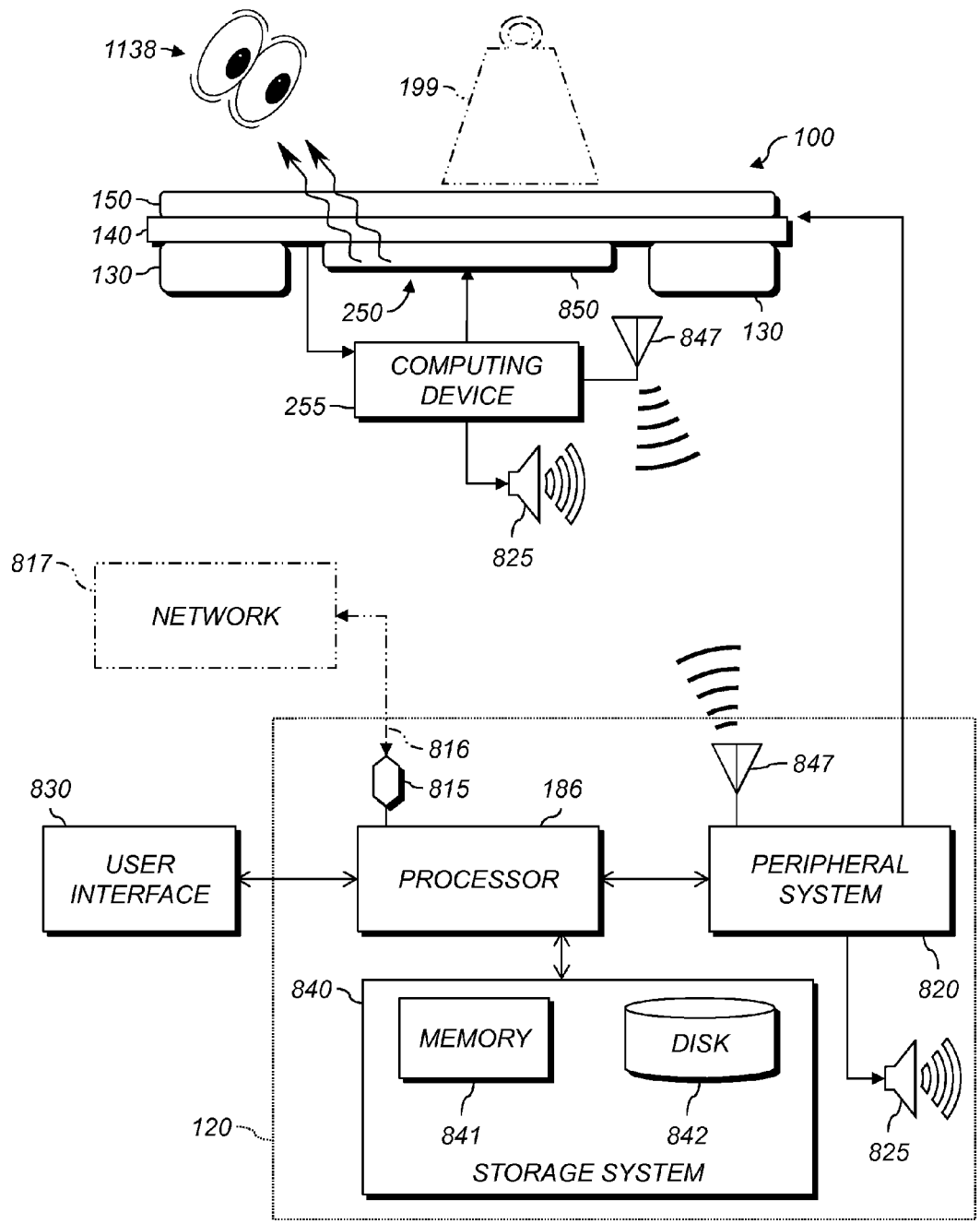
FIG. 8 is a block diagram of components of a scale and related devices according to various embodiments.

FIG. 8 is a block diagram of components of a scale 100 and related devices, including data-processing components for analyzing data and performing other analyses and functions described herein. A network 817 and a load 199 are not part of the system, but are shown for purposes of context. As discussed above, the electronics 120 can be mounted to the housing 110, FIG. 1, the platform 140, or other structures. The electronics 120, e.g., including a user interface 830 having a display, can be attached to or integrated with the top surface of the platform 140. As in the preceding, configurations such as that of the scale 200, FIG. 2, can also be used with components described below.

The electronics 120 can include a peripheral system 820 and a storage system 840 communicatively connected to the processor 186. A user interface 830, e.g., the display on a bathroom scale, can also be communicatively connected to the processor 186. The processor 186 includes one or more data processor(s) that implement processes of various embodiments described herein. A "data processor" is a device for processing data and can include a central processing unit (CPU), a microcontroller unit (MCU), a desktop computer, a laptop computer, a mainframe computer, a personal digital assistant, a digital camera, a cellular phone, a smartphone, or any other device for processing data, managing data, or handling data, whether implemented with electrical, magnetic, optical, biological components, or otherwise. The phrase "communicatively connected" includes any type of connection, wired or wireless, between devices, data processors, or programs in which data can be communicated. Subsystems such as the peripheral system 820, the user interface 830, and the storage system 840 are shown separately from the processor 186 but can be stored completely or partially within the processor 186.

The peripheral system 820 can include one or more devices configured to provide data to the processor 186. For example, the force transducers 130 and the area sensor 150 can be connected to the processor 186 via the peripheral system 820, e.g., using a BLUETOOTH or other wireless link. These components can also be directly connected to the processor 186. The peripheral system 820 can include one or more bus bridge(s), e.g., to communicatively connect devices having USB, FIREWIRE, RS-232, Thunderbolt or other suitable interfaces to the processor 186. The processor 186, upon receipt of data from a device in the peripheral system 820, can store that data in the storage system 840.

In various aspects, the peripheral system 820 includes an antenna 847. The peripheral system 847 communicates wirelessly with the computing device 255 via a corresponding antenna 847 thereof. The connection between the peripheral system 820 and the computing device 255 can also be wired, e.g., a connection via a docking connector or zero-insertion-force connector. In aspects such as that shown in FIG. 2, the peripheral system 820 can receive data from the area sensor 150 via a processor (not shown) in the computing device 255. The peripheral system 820 can receive data from the force transducers directly, even when a computing device 255 is used.

In various aspects, the electronics 120 or the computing device 255 further includes a mechanical transducer 825. The processor 186 is further adapted to operate the computing device 225 via the communications interface, or to communicate via the peripheral system 820, to present via the mechanical transducer 825 an audible or tactile indication corresponding to the load. The mechanical transducer 825 is represented graphically as a speaker, but is not limited to only speakers or to only acoustic devices. For example, the mechanical transducer 825 can include an error buzzer (e.g., a piezoelectric speaker), a clicker, or a chime. The mechanical transducer 825 can also include a mobile-phone-style vibrator (a motor with an off-balance weight affixed to the motor shaft) or a force-feedback pad configured to selectively vibrate or otherwise provide a distinct tactile sensation in a specific area. As discussed below, the mechanical transducer 825 can be included in a mimic pad or other remote device.

The storage system 840 includes or is communicatively connected with one or more tangible non-transitory computer-readable storage medium(s) configured to store information, including the information needed to execute processes according to various embodiments. The term "device" does not imply that storage system 840 include only one piece of hardware that stores data. A "tangible non-transitory computer-readable storage medium" as used herein refers to any non-transitory device or article of manufacture that participates in storing instructions which may be provided to the processor 186 for execution. Such a non-transitory medium can be non-volatile or volatile. Examples of non-volatile media include floppy disks, flexible disks, or other portable computer diskettes, hard disks, magnetic tape or other magnetic media, Compact Discs and compact-disc read-only memory (CD-ROM), DVDs, BLU-RAY disks, HD-DVD disks, other optical storage media, Flash memories, read-only memories (ROM), and erasable programmable read-only memories (EPROM or EEPROM). Examples of volatile media include dynamic memory, such as registers and random access memories (RAM).

Embodiments of the present invention can take the form of a computer program product embodied in one or more tangible non-transitory computer readable medium(s) having computer readable program code embodied thereon. Such medium(s) can be manufactured as is conventional for such articles, e.g., by pressing a CD-ROM. The program embodied in the medium(s) includes computer program instructions that can direct the processor 186 to perform a particular series of operational steps when loaded, thereby implementing functions or acts specified herein.

In an example, the storage system 840 includes a memory 841, e.g., a random-access memory, and a disk 842, e.g., a tangible computer-readable storage device such as a hard drive or a solid-state flash drive. Computer program instructions are read into the memory 841 from the disk 842, or a wireless, wired, optical fiber, or other connection. The processor 186 then executes one or more sequences of the computer program instructions loaded into the memory 841, as a result performing process steps and other processing described herein. In this way, the processor 186 carries out a computer implemented process that provides technical effects described herein, e.g., determining the weight and position of loads on the scale 100. For example, blocks of the flowchart illustrations (e.g., FIGS. 4-7) or block diagrams herein, and combinations of those, can be implemented by computer program instructions. The memory 841 can also store data used by running programs.

Program code to carry out methods described herein can execute entirely on a single processor 186 or on multiple communicatively-connected processors 186. For example, code can execute wholly or partly on a user's computer and wholly or partly on a remote computer, e.g., a server. The remote computer can be connected to the user's computer through the network 817. The user's computer or the remote computer can be non-portable computers, such as conventional desktop personal computers (PCs), or can be portable computers such as tablets, cellular telephones, smartphones, or laptops.

The processor 186 can be communicatively connected to an optional user interface 830. The user interface 830 can include a mouse, a keyboard, another computer (connected, e.g., via a network or a null-modem cable), a microphone and speech processor or other device(s) for receiving voice commands, a camera and image processor or other device(s) for receiving visual commands, e.g., gestures, or any device or combination of devices from which data is input to the processor 186. In this regard, although the peripheral system 820 is shown separately from the user interface 830, the peripheral system 820 can be included as part of the user interface 830. In at least one embodiment, the user interface 830 can be operated by a human user.

The user interface 830 also can include a display device, a touchscreen, a processor-accessible memory, or any device or combination of devices to which data is output by the processor 186. In this regard, if the user interface 830 includes a processor-accessible memory, such memory can be part of the storage system 840 even though the user interface 830 and the storage system 840 are shown separately in FIG. 8. For example, the user interface 830 can include one or more touchscreen(s), speaker(s), buzzer(s), vibrator(s), button(s), switch(es), jack(s), plug(s), or network connection(s).

In various embodiments such as that shown in FIG. 2, and instead of or in addition to the user interface 830, the processor 186 can communicate with a user via the disposed computing device 255. The processor 186 can also or alternatively operate the computing device 255 via a communications interface, such as a wireless link over the antennas 847. In this regard, the touchscreen 250 in the computing device 255 includes the area sensor 150 and an underlying display 850 (or "display screen") that emits or reflects light through the area sensor 150 to a user 1138. The display 850 can be associated with the area sensor 250. The processor 186 can transmit data via the antennas 847 to be displayed on the display 850.

In various embodiments such as those shown in FIG. 2, after the location of the load is measured (e.g., in step 620), an indication thereof is presented on the display 850 or another display screen associated with the area sensor 150. The indication can be a visual indication corresponding to the load. An area of the display 850 corresponding to the detected location of the load 199 can be outlined, made to blink or change color, pointed out by arrows, target reticules, a spiral, or a Web-browser-style page-loading ring, or can be otherwise highlighted visually. This highlighting can provide confirmation to the user that the item is being measured properly. In various aspects, the processor 186 compares the determined weight and the determined location to a set of criteria or to a database of known widgets. The processor 186 then displays an indication specific to a match, e.g., the part number of a widget having a weight and size within 5% of the determined weight and size of the load 199.

In various embodiments, the processor 186 is communicatively connected to a communication interface 815 that is coupled via a network link 816 to the network 817. For example, the communication interface 815 can be a WIFI or BLUETOOTH wireless transceiver and the network link 816 can be a radio-frequency (RF) communications channel. As another example, the communication interface 815 can be a network card to provide a data communication connection to a compatible local-area network (LAN), e.g., an Ethernet LAN, or wide-area network (WAN). The communication interface 815 sends and receives electrical, electromagnetic or optical signals that carry digital data streams representing various types of information across the network link 816 to the network 817. The network link 816 can be connected to the network 817 via a switch, gateway, hub, router, or other networking device.

The processor 186 can send messages and receive data, including program code, to and from the network 817 via the network link 816 and the communication interface 815. For example, requested code for an application program (e.g., a JAVA applet) can be stored on a tangible non-volatile computer-readable storage medium connected to the network 817. A network server (not shown) can retrieve the code from the medium and transmit it via the network 817 to the communication interface 815. The received code can be executed by the processor 186 as it is received, or stored in the storage system 840 for later execution.

In various examples, the network link 816 is a communications link. The processor 186 is further configured to transmit an indication of the determined location of the load 199 on the platform 140 via the communications link. For example, the processor 186 can transmit the location to a remote mimic pad or other tactile interface or to a remote visual display. These and similar devices can reproduce or represent the determined location of the load 199. Such a mimic pad can be used by factory mechanics to monitor experiments at a safe distance from an operating line or machine.

PARTS LIST FOR FIGS. 1-8

100 weighing scale
110 housing
120 electronics
130 force transducer
140 platform
150 area sensor
186 processor
200 weighing scale
210 housing
235 transducer mount
240 platform
245 device holder
250 touchscreen
255 computing device
300 scale
310 supporting surface
340 transverse portion
330, 350 regions
410, 420, 430 steps
440, 450, 460 steps
510, 520, 525, 530 steps
540, 550, 560, 570 steps
610, 620, 630, 640 steps
650, 660 steps
663 decision step
665 step
710, 720, 730 steps
740 decision step
750 step
815 communication interface
816 network link
817 network
820 peripheral system
825 mechanical transducer
830 user interface
840 storage system
841 memory
842 disk
847 antenna
850 display
1138 user While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Separate references to "an embodiment" (or "aspect" or "variant") or "particular embodiments" or the like do not necessarily refer to the same embodiment or embodiments; however, such embodiments are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted. To the extent there are variations of the invention that are within the spirit of the disclosure or are equivalent to the inventions found in the claims, it is the intent that this patent will cover those variations as well.

What is claimed is:

1. A weighing scale comprising:
   a) a platform that supports a load to be weighed by the scale;
   b) one or more force transducers arranged beneath the platform, each configured to output a transducer force signal of the load thereupon;
   c) an area sensor arranged above the platform and configured to output a plurality of area force signals representative of forces applied to respective spatial areas of the platform by the load;
   d) a processor configured to determine a weight of the load placed on the platform and a location of the load with respect to the platform based on the transducer force signals and the area force signals; and
   c) a computing device having the area sensor and a communications interface coupled to the processor, wherein the platform removably retains the computing device.

2. The scale according to claim 1, further including a communications link, the processor further configured to transmit an indication of the determined location via the communications link.

3. The scale according to claim 1, the processor further configured to monitor the force signals over time to detect a change in the weight of the load on the platform.

4. The scale according to claim 1, the computing device further including a display screen associated with the area sensor and the processor further adapted to operate the computing device via the communications interface to present on the display screen a visual indication corresponding to the load.

5. The scale according to claim 1, the force transducers and the area sensor being arranged in respective, laterally-spaced regions.

6. The scale according to claim 5, the respective regions being spaced apart vertically.

7. The scale according to claim 6, the platform including respective portions corresponding to the laterally-spaced regions and a transverse portion connecting the respective portions.

\* \* \* \* \*